Figure 1:
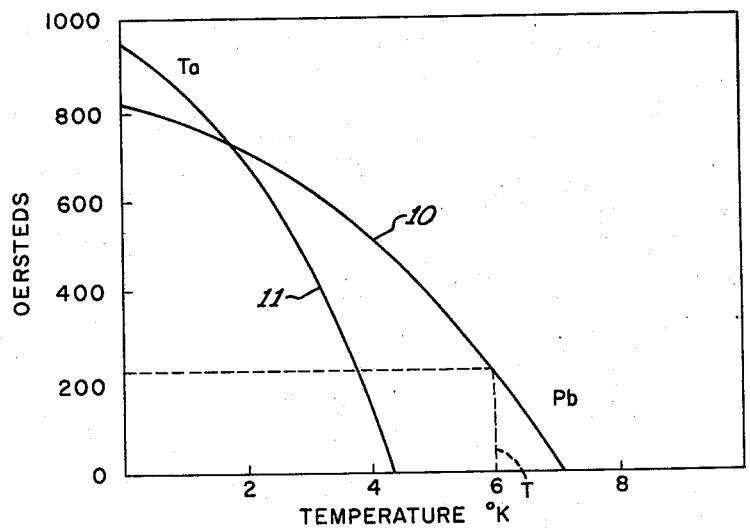

Jan. 28, 1964     O. S. LUTES     3,119,236

SUPERCONDUCTIVE TEMPERATURE CONTROL

Filed April 27, 1962     2 Sheets-Sheet 1

INVENTOR.
OLIN S. LUTES
BY Robert O. Vidas
ATTORNEY

Jan. 28, 1964 O. S. LUTES 3,119,236
SUPERCONDUCTIVE TEMPERATURE CONTROL
Filed April 27, 1962 2 Sheets-Sheet 2

INVENTOR.
OLIN S. LUTES
BY Robert O. Vidas
ATTORNEY

United States Patent Office 3,119,236
Patented Jan. 28, 1964

3,119,236
SUPERCONDUCTIVE TEMPERATURE CONTROL
Olin S. Lutes, Hopkins, Minn., assignor to Minneapolis-Honeywell Regulator Company, Minneapolis, Minn., a corporation of Delaware
Filed Apr. 27, 1962, Ser. No. 190,701
8 Claims. (Cl. 62—3)

The present invention relates to a novel article for temperature control and the method of using same, said article utilizing the magneto-caloric effect of a superconductor to achieve a constant temperature, by virtue of the isothermal nature of a first order phase transformation. More specifically, this invention relates to the achievement of a constant temperature in the superconductive range through the maintenance of a superconductor in transition between the superconducting and normal states.

The present invention also relates to the combination of the superconductive temperature control in a novel magnetic refrigerator.

Superconductivity is a well-know phenomenon. It is known that when certain materials are cooled to a temperature close to 0° K., they exhibit superconductive properties. It is also known that when a magnetic field is applied to the material in the superconductive state, the material ceases to be superconductive at a predetermined field strength (critical magnetic field) which is a function of temperature and the characteristics of the material. The temperature at which a material ceases to exhibit superconductive properties is known as the critical temperature.

The present invention utilizes a phenomenon of the change of state between superconducting and normal to achieve constant temperatures. In other words, by maintaining a superconductor in transition between the two states, it is possible to maintain it at a constant temperature. The maintenance of the superconductor at any predetermined point of transition is dependent on two variables: magnetic field and temperature. Thus, if a superconductor is exposed to a constant magnetic field of critical value, its temperature will remain constant until enough heat leaks into it from the surrounding environment to supply the latent heat of transition. If the superconductor is placed in a cyclic heat exchange relationship with any appropriate heat sink means, its temperature can be maintained at the critical value and thus is constant for indefinite periods of time. As stated above, this type of control finds particular use in a novel low temperature refrigerator, although there are many other uses.

Therefore, it is a principal object of the present invention to provide a novel article for achieving constant temperatures through the maintenance of a superconductor in a state of transition between superconducting and normal.

It is another object to provide a control element capable of maintaining a constant temperature either above or below a reference temperature.

It is a further object to provide a temperature control system for indefinitely maintaining a constant temperature, either above or below the temperature of a primary cooling reservoir, by means of the novel superconductive control provided by the present invention.

It is a further object to provide a refrigerator for continuous operation at a constant temperature utilizing the control disclosed by the present invention.

It is also an object to provide an improved adiabatic magnetization refrigerator having a superconductor as a working element, a first temperature reservoir, and a second temperature control element also being a superconductor.

Other objects of the invention will be apparent from a study of the full description, claims and the accompanying drawings, which disclose the principle of the invention and a preferred embodiment utilizing the invention.

Figures 2, 3:
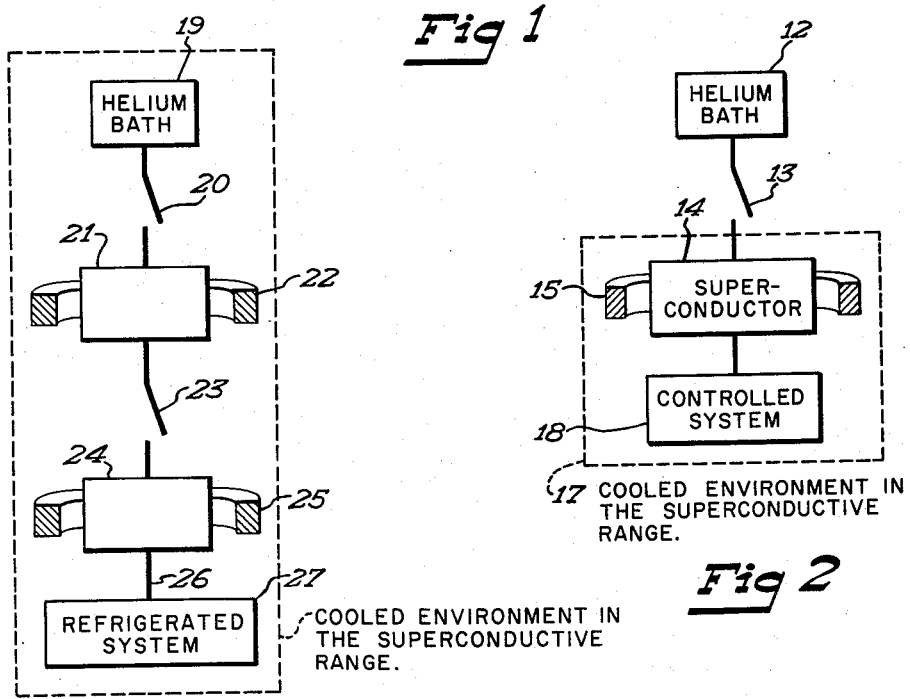
Figure 4:
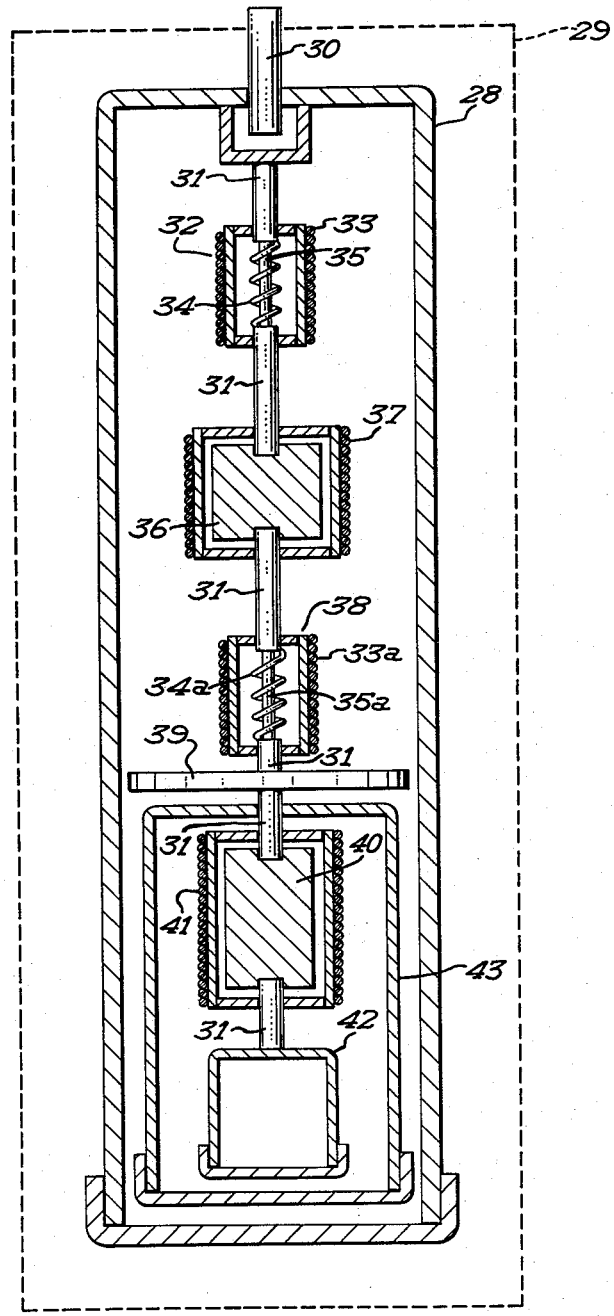

In the drawings:
FIGURE 1 is a graph of magnetic field versus temperature for typical superconductive materials.
FIGURE 2 is a schematic representation of the superconductive temperature control as disclosed by the present invention.
FIGURE 3 is a schematic representation of a magnetic refrigerator utilizing the temperature control disclosed by the present invention.
FIGURE 4 is a preferred embodiment of the present invention in combination with an adiabatic magnetization refrigerator utilizing a superconductor as a working element.

*Control Element*

For each superconductive material, a graph of magnetic field versus temperature can be plotted which characterizes the important property of the particular superconductor. The transition curves for lead and tantalum are shown in FIGURE 1 as curves 10 and 11 respectively. A material is said to be in its superconductive state when the relationship between the applied magnetic field and the temperature of the material is such that the intersection of these values lies in the area beneath the curve of FIGURE 1 corresponding to the material. However, if either the temperature or the magnetic field surrounding the material is increased whereby the intersection of these values occurs in the area above the appropriate curve, the material is said to be in the normal state.

With respect to FIGURE 1, consider that the superconductor is lead, for example, as cooled to temperature T. As long as the magnetic field applied to the conductor is less than the critical value, the conductor will exist in a superconductive state. If the magnetic field is increased above the critical value, the conductor is transformed to the normal conductive state.

If a superconductor is thermally isolated from its surroundings and transition is brought about by increasing the magnetic field to a value greater than the critical value, its temperature will decrease when moving from the superconductive to normal states and conversely, if transition is brought about by a decreasing magnetic field, the temperature will increase when moving from the normal to the superconductive state. This temperature change is due to a decrease in the internal energy of the material caused by the change of state.

If the superconductor is in thermal contact with its surroundings, transition at a constant temperature may be brought about by increasing the magnetic field to a value greater than the critical value. This transition is accompanied by an absorption of heat into the conductor from its surroundings. Transition by decreasing the magnetic field is accompanied by the evolution of heat from the conductor to the surrounding system. Thus it can be seen that a conductor, maintained in transition, is capable of absorbing or emitting heat while remaining at a constant temperature.

The operation of the temperature control element of the present invention is based on the above phenomenon. To obtain a constant temperature, assuming the conductor is in a superconductive state, it is necessary to apply a constant magnetic field of critical value and arrange for a cyclic extraction of heat from the superconductor at such a rate that it is maintained continuously in transition.

Referring to FIGURE 2, a temperature control system is schematically disclosed which utilizes the superconductive constant temperature control disclosed by the present invention. No. 12 represents a helium bath, the temperature of which can be varied by pumping to various pressures. No. 13 is a thermal switch which couples the bath and superconductive element 14 cyclically so as to maintain 14 at transition in conjunction with an applied magnetic field 15 which is at a constant predetermined critical value. The critical field applied depends on the constant temperature desired. This, of course, can be determined from a study of a curve for the superconductive material utilized, such as that shown in FIGURE 1. No. 17 represents an environment which cools 14 to the superconducting range. No. 18 represents the body, etc., the temperature of which is to be controlled and which is in good termal contact with 14. In operation, superconductive element 14 and the body to be controlled 18 are cooled to the superconductive range and the particular temperature desired by a suitable means such as a liquid helium bath. The critical magnetic field corresponding to the constant temperature desired is then applied to 14. Thus, placed in transition at a predetermined point on a curve such as that shown in FIGURE 1, superconductive element 14 absorbs excess heat from the surrounding system 17 and body 18 while remaining at a constant temperature. As the heat content of 14 begins to approach a value tending to cause 14 to move to the normal state, switch 13 is closed. This places 14 in thermal contact with bath 12 which has been cooled by pumping to a temperature slightly below that of 14. The excess heat thus flows from 14 to 12. Thermal switch 13 is cyclically opened and closed in a predetermined manner at the appropriate rate which allows the proper heat exchange for maintaining 14 in transition and thus at a constant temperature.

Various thermal switches are known in the art which are suitable for use with the present invention. The more common type consists of links of metal which are superconducting in the absence of a magnetic field and exhibit low thermal conductivity at very low temperatures. When a magnetic field above the critical magnetic field is applied, the metal is transposed to the normal state and exhibits its normal thermal conductivity which is relatively high. A typical material used for such thermal switches is a strip of lead (Pb). Such a switch is suitable for use in the above described system.

Since all superconductive materials possess different curves, see the typical examples shown in FIGURE 1, it is obvious that the type of material utilized as the superconductive element 14 will be dependent in part, upon the temperature desired to be controlled. Each material can be utilized to control a range of temperatures as can be seen from FIGURE 1, but other ranges and overlapping ranges of all the superconductive materials makes a wide choice possible.

*Prior Art Cyclic Refrigerators*

As previously stated, the novel method of temperature control of the present invention finds particular application in cyclic refrigerators. Previous refrigerators are characterized by inherent temperature fluctuation, since the refrigerated system must cool when heat is removed and warm when heat is absorbed. These prior art devices have attempted to overcome this disadvantage by a rapid-cycle cooling which tends to hold the temperature fluctuation to a minimum but does not remove it entirely. The use of a temperature control element, as disclosed by the present invention, in these devices achieves a constant temperature for indefinite periods of continuous operation with essentially no fluctuation.

A typical refrigerator of the prior art type consists of:

(1) A reference temperature or temperature reservoir such as a helium bath.
(2) A cooling means such as:
    (A) A paramagnetic salt which produces a cooling effect upon demagnetization.
    (B) A superconductor which produces a cooling effect when a magnetic field is applied which causes it to move from the superconducting to the normal state.
    (C) Other suitable cooling means.
(3) A cooled body from which heat is cyclically extracted and thus maintained in a predetermined temperature range. This is the portion of the prior art devices which exhibits the undesired temperature fluctuation.
(4) Thermal switches coupling:
    (A) The temperature reservoir and the cooling means.
    (B) The cooling means and the cooled body.

Cycle of operation: To achieve the cooling effect, the temperature reservoir and the cooling means are placed in thermal contact. The salt or superconductor, if such a cooling means is used, is then subjected to the appropriate magnetic effect to produce cooling and the temperature is thus lowered below that of the thermal reservoir. The body to be cooled is cyclically placed in thermal contact with the cooling means and thus maintained substantially in the temperature range desired although not at a constant temperature.

*Combination Cyclic Refrigerator and Superconductive Temperature Control*

FIGURE 3 is a schematic representation of a refrigerator utilizing the novel temperature control of the present invention to achieve a constant temperature. The entire device is shown surrounded by a thermal isolation means to provide protection from ambient temperatures. The refrigerator comprises a reference temperature means such as a helium bath 19 which is thermally coupled by thermal switch 20 to a cooling means such as, superconductor 21. Any appropriate cooling means may be utilized such as, a superconductor or a paramagnetic salt, but the present invention is not to be limited to either of these. Superconductor 21 is shown in connection with an appropriate magnetic field means 22 which is utilized to provide a cooling effect by adiabatic magnetization. No. 21 is also thermally coupled to the novel superconductive temperature control 24 which consists of a second superconductor and second magnetic field 25. Thermal connection is provided between 21 and 24 by thermal switch 23 which can be opened and closed, as can switch 20. Any thermal switching means known in the art may be utilized herein, but the preferred means is the lead (Pb) wire type previously discussed hereinabove. Temperature control 24 is shown asociated with the second magnetic field means 25 which is utilized to provide the desired critical magnetic field. Temperature control 24 is also shown in good thermal contact 26 with the body or system 27, the temperature of which is to be controlled at a constant value.

Briefly, the helium bath 19 is utilized to cool the entire device to the temperature range desired. Cooling means 21 is then placed in operation to lower its temperature and the temperature of the control 24 to the desired value. Magnetic field means 25 is then utilized to place control 24 in transition and 21 is placed in cyclic operation, pumping heat from control 24 and passing it on to bath 19. The cycle of operation will be more completely described hereinbelow.

The temperature control utilized in the above type of device may also be used for controlling temperatures above the bath temperature. Cooling means 21 is used as a heat pump for supplying heat to control 24 during isothermal demagnetization thus maintaining it at a critical temperature which is higher than the temperature of bath 19. This effect can be achieved by replacing cooling means 21 and magnetic field means 22 with any heating means, such as an electric heater or the like.

*Complete Cycle of Operation*

When the refrigerator of FIGURE 3 is utilized in producing constant temperatures below that of bath 19, the initial cooldown is as follows: Bath 19 is at an initial temperature $T_i$. Superconductive cooling means 21 and superconductive temperature control 24 are brought into thermal equilibrium with each other and with bath 19 at temperature $T_i$ by closing thermal switches 20 and 23. Magnetic field means 22 and 25 are both inactive. When thermal equilibrium has been achieved, switch 20 is opened and magnetic field means 22 is activated to produce a magnetic field which is sufficient to cool superconductors 21, 24 and the refrigerated system 27 by adiabatic magnetization of superconductor 21 to a temperature slightly below the final temperature $T_f$. Magnetic field means 25 is then activated to produce a magnetic field of critical value corresponding to temperature $T_f$, which stabilizes superconductive temperture control 24 at the transition point corresponding to the desired constant temperature $T_f$ after the temperature of 24 has drifted to $T_f$. Thermal switch 23 is now opened and switch 20 is closed. Superconductor 21 is then returned to temperature $T_i$ and the magnetic field on 21 is adjusted to zero or an initial low value.

Following the initial cooldown and positioning of the superconductive temperature control 24 in transition, the refrigerator is placed in steady-state operation. The following cycle is descriptive of such operation. A magnetic field is again produced by magnetic field means 22 and increased from zero or its initial low value to a predetermined value and the superconductive cooling means 21 drops in temperature. During this cooling operation, thermal switches 20 and 23 are both open and superconductor 21 is isolated from bath 19 and the temperature control 24. Upon cooling, 21 drops in temperature to $T_f$, the temperature of the control 24. When this temperature has been reached, thermal switch 23 is closed and the magnetic field produced by 22 is further increased, causing isothermal absorption of heat by 21 from 24 at temperature $T_f$.

During this cooling process, heat is absorbed isothermally by cooling means 21 from the temperature control 24, which is operating at the constant critical magnetic field and in thermal equilibrium with the refrigerated system 27. Thermal switch 23 is opened and the magnetic field on 21 is reduced sufficiently to heat 21 to the bath temperature $T_i$. Switch 20 is then closed and cooling means 21 is placed in thermal equilibrium with bath 19; the magnetic field on 21 is reduced to its initial value, causing a rejection of heat from 21 to bath 19. Switch 20 is open and the complete cycle is repeated continuously.

In actual operation, the proper cycle of heat exchange is determined by actual use. Thus, actual trial runs may be made to determine the cycle necessary for maintaining the temperature control element at transition and at a constant temperature for a particular system.

As stated above, cooling means 21 is not necessarily limited to a superconductor but, may be a paramagnetic salt or any other suitable means known in the art. The superconductive cooling means is considered a preferred embodiment in combination with the superconductive constant temperature control disclosed by the present invention.

*Materials*

There are many superconductive materials available for use as the controlling and refrigerating elements in a device such as that described above. Since large latent heat is advantageous for either of the elements, it is natural to consider the group known as the "hard superconductors" occupying mainly the IV-B and V-B columns of the periodic table. It is by no means necessary that these materials be used, but they are the most advantageous materials known in the art at the present time for the purposes of the present invention.

Tantalum has been chosen as a representative superconductive material to be utilized in the preferred embodiment described hereinbelow.

*Two-Element Superconductive Refrigerator*

Referring to FIGURE 4, a preferred configuration of a magnetic refrigerator, incorporating the constant temperature control of the present invention, is shown in a partially schematic cross-section. The device and all elements are generally cylindrical in configuration.

No. 28 represents a thin walled evacuated chamber of brass, copper, or the like, surrounded by a cooling-means such as a liquid helium at 1.5° K. No. 30 is a supporting tube and electrical conduit of stainless steel or the like. No. 31 represents a combination thermal and supporting member of a good thermal conducting material such as copper. Thermal switch generally designated as 32 is composed of essentially three elements: magnetic means 33 such as a superconductive solenoid used to produce the magnetic field required to regulate the thermal conductivity of lead (Pb) wire 34 and an insulating post 35 supporting the copper members 31. Superconductive cooling means 36 is shown associated with a magnetic field means such as a solenoid winding 37. Below cooling-means 36 and connected by thermal conduit 31 is a second thermal switch generally designated as 38. This switch is the same as switch 32 and the elements thereof are given the same corresponding numbers with the suffix $a$ added. Directly below switch 38 is a magnetic shield 39 which is not necessary to the operation of the refrigerator but is helpful in reducing small variations in field at the constant temperature control 40. The shield 39 is preferably of a high permeability material. Superconductive temperature control 40 is shown in association with a magnetic field means 41, such as another solenoid winding, which is utilized to maintain a constant critical field. Connecting 40 is a copper tubular sample holder 42. The temperature control 40, magnetic field means 41 and sample holder 42 are shown surrounded by a radiation shield 43. This is a metallic shell surfaced with a pure annealed metallic coating of a highly conductive metal such as gold or silver. This facilitates thermal equilibrium and reduces the unwanted heat transfer from the walls of chamber 28.

Electrical circuitry has not been included in FIGURE 4 since the proper electrical connections to the electrical means therein would be obvious to one skilled in the art and are not pertinent to the present invention.

Having thus described the present invention, what is claimed is:

1. The method of maintaining a constant temperature which comprises: cooling a superconductive element to a superconductive temperature range; applying a constant magnetic field to said superconductive element, said magnetic field being at a critical value so as to place and maintain said superconductive element at a transition point between the superconductive and normal states; and establishing a cyclic heat exchange between said superconductive element and a body, the temperature of which differs from that of said superconductive element.

2. The method of maintaining a constant temperature which comprises: cooling a superconductive element to a superconductive temperature range; applying a constant magnetic field to said superconductive element, said magnetic field being at a critical value so as to place and maintain said superconductive element at a transition point between the superconductive and normal states; and establishing a cyclic heat exchange between said superconductive element and a body, said heat exchange being established when the temperature of said body is essentially equal to the temperature of said superconductor.

3. A system for maintaining a certain predetermined temperature comprising: thermal reservoir means; a superconductive element; means for cooling said superconductive element to a superconductive temperature range; magnetic field means in cooperating relationship with said superconductive element for applying a critical magnetic field thereto; and thermal switch means connecting said thermal reservoir and said superconductive element for establishing a cyclic heat exchange therebetween.

4. A control for maintaining a predetermined constant temperature comprising: a superconductive element adapted to be cooled to a superconductive temperature range; magnetic field means in cooperating relationship with said superconductive element for applying a critical magnetic field thereto; cooling means capable of extracting heat from said superconductive element; and thermal switch means connecting said superconductive element and said cooling means for thermally coupling and decoupling said superconductor and said cooling means.

5. A temperature control system comprising: a thermal reservoir means; temperature changing means; a first thermal switch means connecting said thermal reservoir means and said temperature changing means for cyclically establishing a heat exchange relationship therebetween; a superconductive element adapted to be cooled to a superconductive temperature range; magnetic field means in cooperating relationship with said superconductive element for applying a critical magnetic field thereto; and a second thermal switch means connecting said temperature changing means and said superconductive element for cyclically establishing a heat exchange relationship therebetween thereby maintaining said superconductive element in transition and at a predetermined constant temperature.

6. A temperature control system comprising: a thermal reservoir; a first superconductive element; first magnetic field means in cooperating relationship with said first superconductive element for changing the temperature thereof by alternate adiabatic magnetization and demagnetization; first thermal switch means connecting said thermal reservoir and said first superconductive element for cyclically establishing a heat exchange relationship therebetween; a second superconductive element; second magnetic field means in cooperating relationship with said second superconductive element for applying a critical magnetic field thereto; and a second thermal switch means connecting said first and second superconductive elements for cyclically establishing a heat exchange relationship therebetween thereby maintaining said second superconductive element in transition and at a predetermined constant temperature.

7. A magnetic refrigerator for maintaining a predetermined constant temperature including the combination of: constant temperature means; refrigerating means for producing a temperature below that of said constant temperature means; a first thermal switch means thermally insulating said constant temperature means and said refrigerating means; means for rendering said first switch thermally conductive at predetermined intervals thereby equalizing the temperatures of said constant temperature means and said refrigerating means; a constant temperature controller operated at a temperature below that of said constant temperature means, said controller including a superconductor maintained in transition between superconducting and normal states by means of a constant magnetic field and a predetermined cyclic heat exchange relationship with said refrigerating means; a second thermal switch means connecting said refrigerating means and said controller for establishing said heat exchange relationship at predetermined intervals of time; and means for cyclically rendering said second switch thermally conductive at predetermined intervals thereby establishing said heat exchange relationship between said controller and said refrigerating means.

8. An adiabatic magnetic refrigerator comprising: a first constant temperature means; means including a first superconductor for establishing a temperature differential; means for alternately magnetizing and demagnetizing said first superconductor; a first thermal switch means for controlling the flow of heat between said first constant temperature means and said first superconductor whereby said first switch affects equalization of temperatures of said first constant temperature means and said first superconductor after the latter has been demagnetized following magnetization of said first superconductor; a second constant temperature means subsisting at a temperature lower than said first constant temperature means and including a second superconductor maintained in transition between superconducting and normal states by means of a constant magnetic field; and a second thermal switch, said second thermal switch controlling the flow of heat between said second superconductor and said first superconductor whereby a heat exchange relationship is established between said first and said second superconductors after said first superconductor is subjected to a predetermined magnetic field.

References Cited in the file of this patent

UNITED STATES PATENTS

| | | |
|---|---|---|
| 2,666,884 | Ericcson | Jan. 19, 1954 |
| 2,832,897 | Buck | Apr. 29, 1958 |
| 2,913,881 | Garwin | Nov. 24, 1959 |
| 3,004,394 | Fulton | Oct. 17, 1961 |